Patented Oct. 9, 1934

1,975,962

UNITED STATES PATENT OFFICE 1,975,962

RINSE WATER CONDITIONER AND PROCESS

John F. Littooy, San Francisco, Calif., assignor to Hercules Glue Company, San Francisco, Calif., a corporation of California No Drawing. Application May 15, 1929, Serial No. 363,404

4 Claims. (Cl. 146—219)

In fruit packing plants it is universally the practice to wash such fruit as apples, usually in an acid washing solution, to remove spray residue. The fruit is then rinsed, after it has been removed from the washing solution, in supposedly clear water (actually this becomes acidulated through acid solution carried over by the apples from the washing tank), and is delivered to the sorting tables and to the packing bins. Between the rinse tank and the packing bins—preferably between the rinse tank and the sorting tables—the apples must be dried, for they cannot dry properly as they lie in closely packed masses in the packing bins, because air does not circulate freely about them. It is also highly inconvenient, and to some degree dangerous to the sorters and packers if the fruit is not dried before it reaches them. Any concentration of acid or soluble arsenic compounds (which is sometimes found because of the use of alkali water) in the stem or calyx ends, and beneath the sepals, promotes injury to the fruit and impairs its keeping qualities, yet this cannot be removed by drying agencies heretofore employed. Wet or moist apples, if even slightly bruised or punctured, as occurs in their handling or temporary storage, will absorb the moisture, and whether the moisture be acid or arsenic-bearing, or reasonably pure, the condition and keeping qualities of the apples are adversely affected. Chemicals picked up from the apples on the hands or gloves of sorters and packers will quickly prove injurious, yet these workers must change gloves, under conditions obtaining heretofore, very frequently, to allow them to dry, and some must wear rubber gloves to protect themselves from injury.

It may be that the apples would dry if given sufficient time and were spaced to provide free air circulation, but it is not economically possible to employ as much space as would be required for this purpose, and furthermore, damage will result to the fruit in many cases if the acid or arsenic is left to concentrate for the time required for natural drying. To preserve the fruit from damage it must be dried quickly, and yet it has not been possible heretofore to dry the fruit quickly and thoroughly enough by any known methods. It is to the solution of this problem that my present invention is directed.

I have discovered that the reason why apples do not dry quickly, after rinsing, is because the high surface tension of the rinse water causes the water to collect and cling to the fruit in drops, which under average temperature conditions and with free circulation of air require an hour or more to dry. Particularly is it difficult to dry the stem and calyx ends, where capillary force tends to hold the moisture against all attempts to remove it by mechanical, pneumatic, or thermal means. Inasmuch as about three minutes, or less, are required to move the fruit from the rinse tank to the packing bins, it is clear that means and a method must be provided whereby the moisture may ordinarily and regularly be removed in three minutes or less.

The various disadvantages, discomforts, and losses touched on above have heretofore been treated as unavoidable and incident to the business, but I have discovered how the fruit may be placed in condition for drying under natural conditions and at normal temperatures in about a minute or less, especially where forced air draft is employed, thus eliminating all such losses and discomforts, through a process of conditioning the rinse water, into which the fruit is dipped after its removal from the washing solution, to lower its surface tension and to cause it to form a persisting film of substantially uniform thickness over the surface of the fruit, rather than collecting in drops, or in the depressions. With rinse water thus conditioned not only is there a larger wet surface area continually exposed to drying agencies, but there is a tendency to maintain the film intact, and to replace water which has been evaporated or removed from the more exposed areas with water drawn by capillary attraction (due perhaps to the presence of minute closely spaced solid particles which are deposited as the film dries) from the reservoirs in the depressions, and from beneath the sepals. There is thus a positive drawing or moving of the water from the protected areas or water traps to the exposed areas, from whence it can with facility be removed or evaporated. Results have shown that apples which under former conditions could not be dried inside of an hour, are dried with the assistance of my conditioner in not to exceed one minute—less than the time required to place the apple in the hands of the sorter after leaving the rinse tank. Packers and sorters who formerly changed gloves every few minutes, to permit the wet gloves to dry, now use a single pair all day, and find them scarcely damp at night.

Not only is it possible to accelerate the drying, but it is possible at the same time to neutralize the acid condition of the rinse water, occasioned by some of the washing solution being carried over on the fruit, and thus to forestall the possibility of acid burns and rotting. This, however, is a subsidiary feature of my invention or discovery, which relates, in the main, to a substance for conditioning the rinse water, as specifically distinguished from the washing solution, to the improved rinse solution itself, and to the process of preparing the rinse water and of rinsing the fruit.

The features which I consider as being of the essence of my invention or discovery will be pointed out in this specification, and will be particularly defined by the claims terminating the same.

As has been mentioned above, the rinse water ordinarily used to remove the acidulous washing solution from the fruit is intended as pure water, though it is usually tinged with acid, or carries in solution soluble arsenic compounds. This water or slightly acid solution tends to gather in drops, which present large volumes (as compared to the capacity of the drying agencies employed) with small surface areas, and the drying agencies, acting over the entire surface of the fruit, cannot be sufficiently concentrated on these random drops, or on the collections in the depressions, in the limited time permitted them to act, to remove the water completely. In order to spread the drops over larger areas, thus to expose the water more uniformly to the drying agencies, I add to the rinse water a substance which lowers its surface tension, and which gives to it a tendency to spread as a film, and to maintain that film of uniform thickness, drawing from the depressions to compensate for a deficiency on the more exposed areas.

Various substances may be employed as a conditioner to achieve this effect, proteins—particularly casein—being highly effective. When arsenic compounds are the chief components of the spray residue, all alkali-soluble protein-containing substances, such as casein, albumens, soya bean meal, peanut meal, etc., may be employed, as well as other substances including some carbohydrates, soluble resinates, etc., all of which are colloid-forming materials tending to lower the surface tension of the rinse water. These are given as illustrations, rather than as limitations, and as many substances of this general character will operate satisfactorily, naturally I do not wish to be limited, in the broader aspects of my invention, or as relates to the process, to the use of any given substance. However, certain substances have the advantages of cheapness, availability, or better effectiveness, and I shall therefore proceed to describe one substance which gives particularly valuable results, being also comparatively cheap and readily available, as illustrative of the principle of my discovery.

Casein is particularly effective, and while it would be satisfactory alone, its cost, used in the quantities necessary, might run the cost of the rinsing higher than the packer desires to pay. As a complemental dispersing or film-forming agent, and as a means of increasing the uniformity of the film formed on the fruit, I use powdered rosin or dextrin, a carbohydrate, or a mixture of the two. Soda ash, in small quantities, may be added as an accelerator to disperse or dissolve the casein and rosin or dextrin in the rinse water, though obviously its inclusion is purely a convenience. As a vehicle and filler for the other ingredients, and as a neutralizing agent for acid in the rinse water, I may use calcium hydrate (hydrated lime). It may be omitted, so far as a conditioner, or aid to drying. For the latter purpose only such a colloid as casein or rosin or dextrin need be employed, these agents acting much alike, but the rosin or dextrin may replace part of the more expensive but more efficient and desirable casein or other protein.

The proportions of the ingredients are subject to considerable variations. Of casein or its protein equivalent (ground dried and defatted beef or horse-meat, milk or blood, albumen, etc.) I use from 8 to 20%. Of soda ash or its equivalents (sodium bicarbonate or trisodium phosphate) some 2% or less is sufficient. Rosin or dextrin should not ordinarily exceed 8% of the whole, though even small quantities, 1% or less, are beneficial, though these require larger percentages of the more expensive casein. The calcium hydrate (Ca(OH)$_2$) is employed as a filler, to complete the whole. Thus, a satisfactory mixture, from the standpoint of effectiveness and cost, contains the ingredients in the following proportions:

| | Per cent |
|---|---|
| Casein | 16 |
| Powdered rosin or dextrin | 5 |
| Soda ash | 2 |
| Calcium hydrate | 77 |
| | 100 |

This mixture is a powder from which is made a creamy fluid which is either mixed into the rinse tank in the proportion of one pound of dry powder to 100 gallons of water, or, if the rinse water is wasted away and renewed, the fluid is permitted to drip into the rinse water at the rate of one pound of powder to each fresh 100 gallons of water.

Fruit rinsed in water so conditioned will not permit the water to collect in drops, but such water as clings to the fruit will spread as a film over its surface. The fruit is then subjected to drying agents, as wiping cloths, jets or blasts of heated air, etc., and as water is removed from the exposed portions of the fruit it is replaced by water drawn from the protected portions, tending to restore and equalize the film, until finally the film is reduced to negligible thickness. During this action the water is drawn from the depressions at the stem and calyx ends, from beneath and around the sepals, and from minute abrasions, and as a result all deleterious substances are withdrawn, or spread so thinly that no damage to the fruit can occur from such sources.

What I claim as my invention is:

1. A process of rinsing acid treated fruit for packing which comprises subjecting the fruit to the action of a colloidal solution of casein, and then subjecting the fruit for a period of short duration to drying conditions during which the colloidal solutions tends to become evenly distributed over the surface of the fruit and dries rapidly.

2. A process of rinsing acid treated fruit for packing which comprises subjecting the fruit to the action of a colloidal solution of casein containing an acid neutralizer, and then subjecting the fruit for a period of short duration to drying conditions during which the colloidal solution tends to become evenly distributed over the surface of the fruit and dries rapidly.

3. A process of rinsing acid treated fruit for packing which comprises subjecting the fruit to the action of a colloidal solution of casein and rosin containing soda ash and hydrate of lime, and then subjecting the fruit for a period of short duration to drying conditions during which the colloidal solution tends to become evenly distributed over the surface of the fruit and dries rapidly.

4. A process of rinsing fruit for packing, for employment, after the fruit has been washed, comprising subjecting the fruit to the action of a protein-bearing colloidal solution, and next subjecting the fruit for a period of short duration to drying conditions during which the colloidal solution tends to become evenly distributed over the surface of the fruit and dries rapidly.

JOHN F. LITTOOY.